United States Patent
Roberts et al.

(10) Patent No.: US 8,699,988 B2
(45) Date of Patent: Apr. 15, 2014

(54) METHOD, DEVICE AND SYSTEM FOR SENDING AND RECEIVING MESSAGES

(75) Inventors: Michael Roberts, Shenzhen (CN); Min Huang, Shenzhen (CN); Junhui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 12/544,880

(22) Filed: Aug. 20, 2009

(65) Prior Publication Data

US 2010/0075627 A1 Mar. 25, 2010

(30) Foreign Application Priority Data

Sep. 23, 2008 (CN) .......................... 2008 1 0166342

(51) Int. Cl.
*H04M 11/04* (2006.01)
(52) U.S. Cl.
USPC .................. 455/404.1; 455/404.2; 455/414.1; 455/436
(58) Field of Classification Search
USPC .................................... 455/437, 404.1, 404.2
See application file for complete search history.

(56) References Cited

U.S. PATENT DOCUMENTS

| | | | |
|---|---|---|---|
| 5,301,225 A | 4/1994 | Suzuki et al. | |
| 5,361,397 A | 11/1994 | Wright | |
| 2005/0227666 A1* | 10/2005 | Cheng | 455/404.1 |
| 2008/0102896 A1* | 5/2008 | Wang et al. | 455/560 |
| 2011/0059718 A1* | 3/2011 | Wang et al. | 455/404.1 |
| 2011/0171928 A1* | 7/2011 | Vikberg et al. | 455/404.1 |

FOREIGN PATENT DOCUMENTS

| | | |
|---|---|---|
| CN | 101137173 A | 3/2008 |
| CN | 101662755 B | 10/2011 |

OTHER PUBLICATIONS

3GPP TS 22.168 V8.1.0, "3rd Generation Partnership Project; Technical Specification Group Services and System Aspects; Earthquake and Tsunami Warning System (ETWS) requirements;Stage 1," Jun. 2008.
3GPP TS 23.041 V7.0.0, "3rd Generation Partnership Project; Technical Specification Group Terminals; Technical realization of Cell Broadcast Service (CBS) (Release 7)," Mar. 2006.
3GPP TS 36.331 V8.2.0, "3rd Generation Partnership Project; Technical Specification Group Radio Access Network; Evolved Universal Terrestrial Radio Access (E-UTRA) Radio Resource Control (RRC); Protocol specification (Release 8)," May 2008.
Extended European Search Report for Application No. 09166863.2-2412, dated Nov. 4, 2009, 11 pages.

(Continued)

*Primary Examiner* — Charles Appiah
*Assistant Examiner* — Mazda Sabouri

(57) ABSTRACT

A method, a device, and a system for sending and receiving messages are provided. The method for sending messages includes: receiving, by a Mobility Management Entity (MME), an Earthquake and Tsunami Warning System (ETWS) message; setting an information change identifier if the received ETWS message is different from the ETWS message stored by the MME; and sending the received ETWS message and the information change identifier. In the embodiments of the present disclosure, the MME decides whether to send the ETWS message to the eNB. Therefore, the eNB needs only to transmit the received message to the UE transparently, and does not need to judge the content of the ETWS message, thus simplifying the process of the eNB sending the ETWS message and reducing the load of the access network device.

4 Claims, 3 Drawing Sheets

(56) References Cited

OTHER PUBLICATIONS

3rd Generation Partnership project (3GPP™), 3rd Generation Partnership Project, Technical Specification Group Services and System Aspects, Earthquake and Tsunami Warning System (ETWS) requirements, Stage 1 (Release 8) (3GPP TS 22.168 v.8.1.0 (Jun. 2008) Technical Specification, Global System for Mobile Communication, © 2008, 3GPP Organization Partners, 12 pages.

NTT DOCOMO, Inc., S1AP procedures to support ETWS in E-UTRAN, Memo, Aug. 18-22, 2008, 5 pages.

3rd Generation Partnership Project (3GPP™) 3rd Generation Partnership Project, Technical Specification Group Services and System Aspects, Earthquake and Tsunami Warning System Requirements and Solutions ETWS), Solution Placeholder (Release 8), (3GPP TR 23.828 v1.0.0 (Jun. 2008) Technical Report, Global System for Mobile Communication, © 2008, 3GPP Organization Partners, 22 pages.

3GPP TSG CT WG1 Meeting #54, C1-082197 Change Request TS 23.041 CR 0020 V.7.0.0, Spec Sheet, Jun. 23-27, 2008, © 2008, 3GPP Organization Partners, 5 pages.

3GPP TSG-RAN WG1 Meeting #66, R2-092883 Memo, Report on Email discussion [65b-7]: ETWS security handling and duplicate detection, May 4-8, 2009, © 2008, 3GPP Organization Partners, 9 pages.

3GPP TSG-RAN WG2 Meeting #63bis, R2-085547 Memo, Battery Saving for Receiving ETWS, Sep.-Oct. 3, © 2008, 3GPP Organization Partners, 7 pages.

First Chinese Office Action dated (mailed) Dec. 9, 2011, issued in related Chinese Application No. 201110086735.7 Huawei Technologies Co. Ltd.

* cited by examiner

METHOD, DEVICE AND SYSTEM FOR SENDING AND RECEIVING MESSAGES

This application claims the benefit of priority to Chinese Patent Application No. 200810166342.5, filed Sep. 23, 2008, and entitled "METHOD, DEVICE AND SYSTEM FOR SENDING AND RECEIVING MESSAGES", the entire content of which is incorporated herein by reference in its entirety.

FIELD OF THE DISCLOSURE

The present disclosure relates to mobile communication technologies, and in particular, to a method, a device, and a system for receiving and sending messages.

BACKGROUND

Long Term Evolution (LTE) is a next-generation mobile broadband network standard developed by the 3rd Generation Partnership Project (3GPP) standardization organization, and is characterized by a high spectrum utilization ratio, a high transmission speed, and a low transmission delay.

An LTE system message sent to the User Equipment (UE) may carry, for example, an Earthquake and Tsunami Warning System (ETWS) message. In this way, in the case of earthquake or tsunami, the LTE system can provide the relevant information such as tsunami alert and rescue information to the UE in time.

The ETWS message falls into two types: Primary Notification (PN) and Secondary Notification (SN). A PN carries fewer contents, and is configured to provide notification of an emergency event; and an SN carries more contents, and is configured to release the relevant information after the emergency event. The ETWS system is primarily configured for special occasions such as alert and rescue. Therefore, the transmission of the ETWS message, especially the PN information, is sensitive to delay.

In the process of developing the present disclosure, it was found that: in the solution in the prior art, the signaling flow for the evolved Node B (eNB) to send an ETWS message to the UE is rather complicated.

SUMMARY

A method, a device, and a system for sending and receiving messages are disclosed in an embodiment of the present disclosure to simplify the signaling flow of sending an ETWS message from an eNB.

A method for sending a message is disclosed in an embodiment of the present disclosure. The method includes:
receiving, by a Mobility Management Entity (MME), an ETWS message;
setting an information change identifier if the received ETWS message is different from the ETWS message stored by the MME; and
sending the received ETWS message and the information change identifier.

A method for receiving a message is disclosed in an embodiment of the present disclosure. The method includes:
handing over or reselecting, by a UE, from cell A to a neighboring cell B;
acquiring, by the UE, an area identifier carried by a system message of the neighboring cell B, wherein the area identifier indicates an area that covers the cell B; and
acquiring an ETWS message carried in the system message if the area identifier is different from the area identifier stored by the UE.

A method for receiving a message is disclosed in an embodiment of the present disclosure. The method includes:
acquiring, by an eNB, a serial number in a system message; and
sending an ETWS message carried in the system message to a UE if the serial number is different from the received serial number.

An MME is disclosed in an embodiment of the present disclosure. The MME includes:
a receiving unit, configured to receive an ETWS message;
a setting unit, configured to: set an information change identifier if the received ETWS message is different from the ETWS message stored by the MME; and
a sending unit, configured to send the ETWS message received by the receiving unit and the information change identifier set by the setting unit.

UE is disclosed in an embodiment of the present disclosure. The UE includes:
an executing unit, configured to acquire an area identifier carried by a system message of a neighboring cell B to which the UE is handed over or reselected, wherein the area identifier indicates an area that covers the cell B; and
an acquiring unit, configured to acquire an ETWS message carried in the system message if the area identifier is different from the area identifier stored by the UE.

An eNB is disclosed in an embodiment of the present disclosure. The eNB includes:
an operating unit, configured to acquire a serial number in a system message; and
a sending unit, configured to send an ETWS message carried in the system message if the serial number is different from the received serial number.

A system is disclosed in an embodiment of the present disclosure. The system includes an MME. The MME is configured to: receive an ETWS message; set an information change identifier if the received ETWS message is different from the ETWS message stored by the MME; and send the received ETWS message and the information change identifier.

In the embodiments of the present disclosure, the MME decides whether to send the ETWS message to the eNB. Therefore, the eNB needs only to transmit the received message to the UE transparently, and does not need to judge the content of the ETWS message, thus simplifying the process of the eNB sending the ETWS message and reducing the load of the access network device.

DETAILED DESCRIPTION

Embodiments consistent with present disclosure are expounded below by reference to accompanying drawings. The embodiments given herein are only part of the embodiments of the present disclosure. Those skilled in the art can derive other embodiments from the embodiments given herein without making any creative effort, and all such embodiments are covered by the protection scope of the present disclosure.

Figure 1:
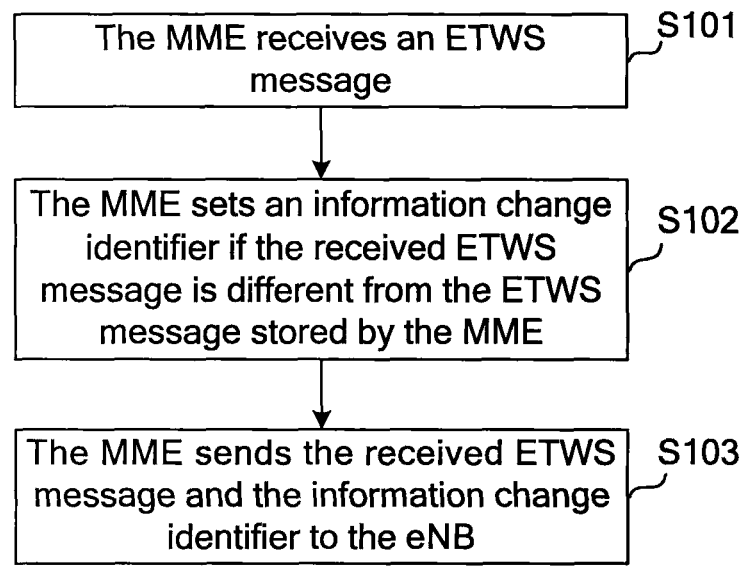
FIG. 1 is an exemplary flowchart of the first embodiment of the present disclosure.

FIG. 1 is a flowchart of the first embodiment of the present disclosure. A method for sending a message is disclosed in the first embodiment of the present disclosure. The method includes the following steps:

S101: An Mobility Management Entity (MME) receives an ETWS message.

The ETWS message may be a PN message and/or an SN message.

S102: The MME sets an information change identifier if the received ETWS message is different from the ETWS message stored by the MME.

If the received ETWS message is a PN message, the MME compares the received message with the PN message stored by the MME. If they are different, the MME changes the value of the information change identifier, for example, adds 1 to the existing value.

Further, the MME may set a special area for storing the information change identifier, or buffer the information change identifier, write the set information change identifier into a message in the subsequent processing process, and send the message.

S103: The MME sends the received ETWS message and the information change identifier to the eNB.

The MME may add the ETWS message into a system message, and send the message to the eNB through broadcast, multicast or unicast. The information change identifier may be added together with the ETWS message into the same system message.

Preferably, the MME may set an eNB list for storing the eNB information. The MME can send the ETWS message to the eNB in the list. For example, according to the information in the list, eNB1 and eNB2 are in the same emergency area (emergency area A), and eNB3 and eNB4 are in the same emergency area (emergency area B). Therefore, the MME may send the ETWS message to every Node B (namely, eNB 1 and eNB 2) in emergency area A, or send the ETWS message to every Node B (namely, eNB1-eNB4) in emergency area A and emergency area B.

In this embodiment, the MME may further store the received ETWS message so that the MME can obtain a more accurate result of the next comparison between the received ETWS message and the ETWS message stored by the MME.

It should be noted that, if the ETWS message received by the MME in S101 is the same as the ETWS message stored by the MME, the MME does not need to set the information change identifier or store the received ETWS message.

Optionally, the system message involved in this embodiment may be in the following SIB1 syntax structure, where the information change identifier is underlined.

SIB1(System Information Block Type1 Message)

```
-- ASN1START
SystemInformationBlockType1  ::=   SEQUENCE {
    cellAccessRelatedInformation      SEQUENCE {
        plmn-IdentityList                PLMN-IdentityList,
        trackingAreaCode                 TrackingAreaCode,
        cellIdentity                     CellIdentity,
        cellBarred                       ENUMERATED {barred, notBarred},
        intraFrequencyCellReselection    BOOLEAN           OPTIONAL, -- Cond CellBarred
        cellReservationExtension         ENUMERATED {reserved, notReserved},
        csg-Indication                   BOOLEAN
    },
    cellSelectionInfo                  SEQUENCE {
        q-Rxlevmin                       INTEGER (-70..-22),
        q-Rxlevminoffset                 INTEGER (1..8)    OPTIONAL -- value range FFS
    },                                   --need FFS
    frequencyBandIndicator             INTEGER (1..64),
    schedulingInformation              SchedulingInformation,
    tdd-Configuration                  TDD-Configuration   OPTIONAL,
    si-WindowLength                    ENUMERATED {ms1, ms2, ms5, ms10, ms15, ms20,
                                        ms40, spare1},
    systemInformationValueTag          INTEGER (0..31),
    ETWS-ChangeMark                    INTEGER (0..31),
    nonCriticalExtension               SEQUENCE { }       OPTIONAL
}
PLMN-IdentityList ::=                SEQUENCE (SIZE (1..6)) OF SEQUENCE {
    plmn-Identity                       PLMN-Identity,
    cellReservedForOperatorUse          ENUMERATED {reserved, notReserved}
}
SchedulingInformation    ::= SEQUENCE (SIZE (1..maxSI-Message)) OF SEQUENCE {
    si-Periodicity                      ENUMERATED {rf8, rf16, rf32, rf64, rf128, rf256, rf512,
                                        spare1, ...},
    sib-MappingInfo                     SIB-MappingInfo
}
SIB-MappingInfo    ::= SEQUENCE (SIZE (1..maxSIB)) OF SIB-Type
-- ASN1STOP
```

Optionally, the system message involved in this embodiment may be in the following SIB11 syntax structure, where the information change identifier is underlined. In this way, the scheduling of the system message is simplified, and the system overhead is reduced.

| SIB11(System Information Block Type11 Message) |
| --- |
| -- ASN1START |
| SystemInformationBlockType11 ::=   SEQUENCE { |
|    etws-SegmentType              ENUMERATED {notLastSegment, lastSegment}, |
|    etws-SegmentNumber            INTEGER (0..63),         -- Value range |
| FFS |
|    etws-SecondaryNotification    OCTET STRING, |
|    <u>ETWS-ChangeMark              INTEGER (0..31),</u> |
|    ... |
| } |
| -- ASN1STOP |

In this embodiment, the MM decides whether to send the ETWS message to the eNB. Therefore, the eNB needs only to transmit the received message to the User Equipment (UE) transparently, and does not need to judge the content of the ETWS message, thus simplifying the process of the eNB sending the ETWS message and reducing the load of the access network device.

Figure 2:
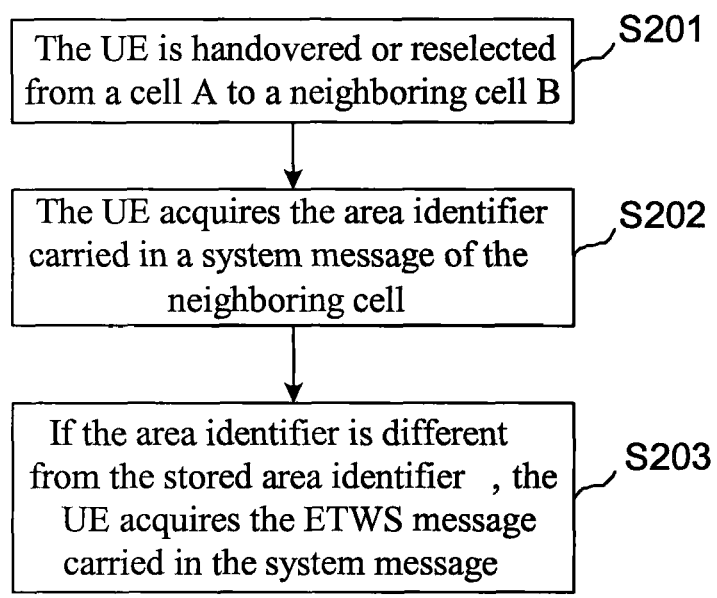
FIG. 2 is an exemplary flowchart of the second embodiment of the present disclosure.

FIG. 2 is a flowchart of the second embodiment of the present disclosure. A method for receiving a message is disclosed in the second embodiment of the present disclosure. The process of receiving the message at the UE includes the following steps:

S201: The UE is handed over or reselected from a cell A to a neighboring cell B.

S202: The UE acquires the area identifier carried in a system message of the neighboring cell B.

The area identifier is configured to indicate the area that covers the cell. Specifically, if cell A and the neighboring cell B are in the same area such as emergency area X, the area identifier of the two cells is the same; if the two cells are in two different areas, the area identifier differs between the two cells.

S203: If the area identifier is different from the stored area identifier, the UE acquires the ETWS message carried in the system message.

Preferably, the UE may store the ETWS message acquire in S203, or store the area identifier acquire in S202, thus avoiding acquiring of the message identical to the previously received ETWS message to some extent. If the UE stores both the acquired ETWS message and the acquired area identifier, the UE avoids acquiring of the message identical to the previously received ETWS message to a great extent.

This embodiment is applicable in this scenario: When a UE moves from one cell to another, the UE judges whether it is necessary to reread the system message; if necessary, the UE reacquire all system messages, including the ETWS message. However, if the UE repeats acquiring the ETWS messages of the same content in the same area, it is a waste of power. Through this embodiment, the UE does not need to reacquire the ETWS messages in the system messages of different cells in the same area, thus saving power.

It should be noted that, a system message may be sent between the MME and the eNB through broadcast. The MME may receive the ETWS message sent by a Cell Broadcast Center (CBC), and send the message to the eNB through an eNB interface S1 connected with the eNB. If an eNB is attributable to at least two areas, the eNB can receive the ETWS messages sent by the MMEs in at least two areas. In this case, the MME can use a serial number to mark the ETWS message sent by the MME. Therefore, according to the serial number, the eNB can identify the MME from which each ETWS message is sent. Specifically, the ETWS messages sent by the same MME correspond to the same serial number; and the ETWS messages sent by different MMEs correspond to different serial numbers. The serial number may be part of the ETWS message, or added together with the ETWS message into one system message.

Figure 3:
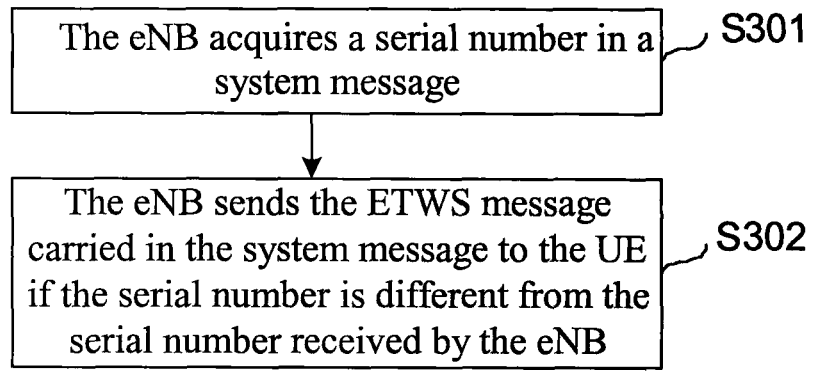
FIG. 3 is an exemplary flowchart of the third embodiment of the present disclosure.

FIG. 3 is a flowchart of the third embodiment of the present disclosure. A method for receiving a message is disclosed in the third embodiment of the present disclosure. The method includes the following steps:

S301: The eNB acquires a serial number in the system message.

S302. The eNB sends the ETWS message carried in the system message to the UE if the serial number is different from the serial number received by the eNB.

Further, the eNB does not need to acquire the ETWS message or send the acquired ETWS message to the UE if the serial number is the same as the serial number received by the eNB.

In this embodiment, the eNB may compare the serial number in the ETWS message to check whether the received message is a duplicate of the previously received message, thus improving the efficiency of sending the messages.

Besides, the eNB may forward the ETWS message from the MME to the UE transparently, or a corresponding relationship may be set up between the serial number of the ETWS message and the information change identifier in the system message, or the corresponding relationship may be set up between the serial number of the ETWS message and the area identifier in the system message. Taking the former as an example, when the eNB sends the ETWS message to the UE, the eNB modifies the serial number corresponding to the information change identifier to be the information change identifier, and sends the information change identifier to the UE, thus ensuring consistency between the ETWS message received by the eNB and the ETWS message sent to the UE, and facilitating the UE to acquire the messages in the same mode.

It should be noted that, the foregoing embodiments may be combined to better simplify the signaling flow and improve the efficiency of sending messages.

Figure 4:
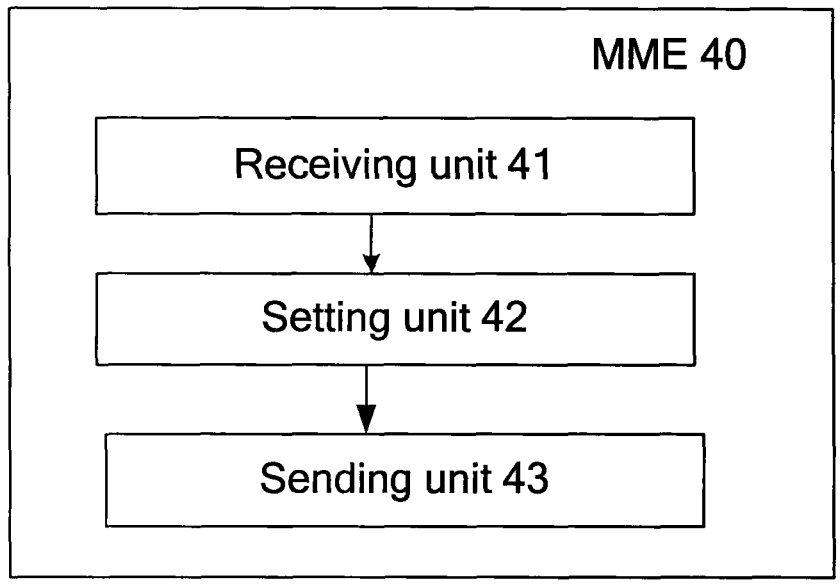
FIG. 4 is an exemplary schematic structural view of a MME according to the fourth embodiment of the present disclosure.

An MME is disclosed in the fourth embodiment of the present disclosure, as shown in FIG. 4. The MME 400 includes:

a receiving unit 41, configured to receive an ETWS message;

a setting unit 42, configured to set the information change identifier if the received ETWS message is different from the ETWS message stored by the MME 400; and a sending unit 43, configured to send the ETWS message received by the receiving unit 41 and the information change identifier set by the setting unit 42.

The MME 400 may further include a storing unit (not shown), which is configured to store the received ETWS messages and/or the information change identifier.

Figure 5:
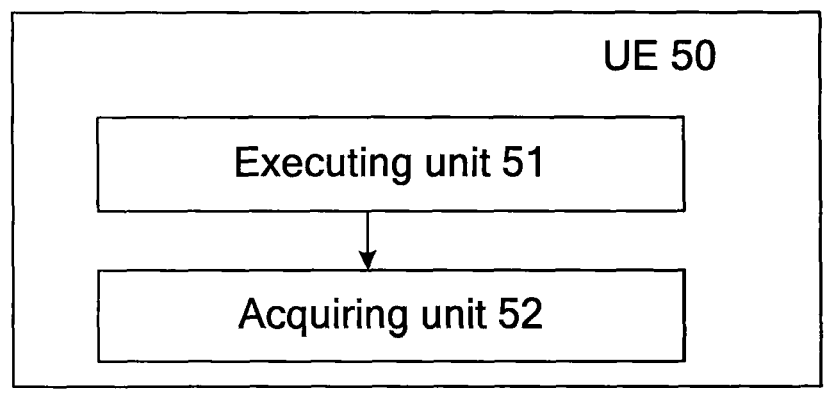
FIG. 5 is an exemplary schematic structural view of a UE according to the fifth embodiment of the present disclosure.

A UE is disclosed in the fifth embodiment of the present disclosure, as shown in FIG. 5. The UE 50 includes:

an executing unit 51, configured to acquire an area identifier carried by a system message of a neighboring cell B to which the UE 50 is handed over or reselected, wherein the area identifier indicates an area that covers the cell; and an acquiring unit 52, configured to acquire the ETWS message carried in the system message if the area identifier is different from the area identifier stored by the UE 50.

The UE 50 may further include a storing unit (not shown), which is configured to store the acquire ETWS message and/or the acquire area identifier.

Figure 6:
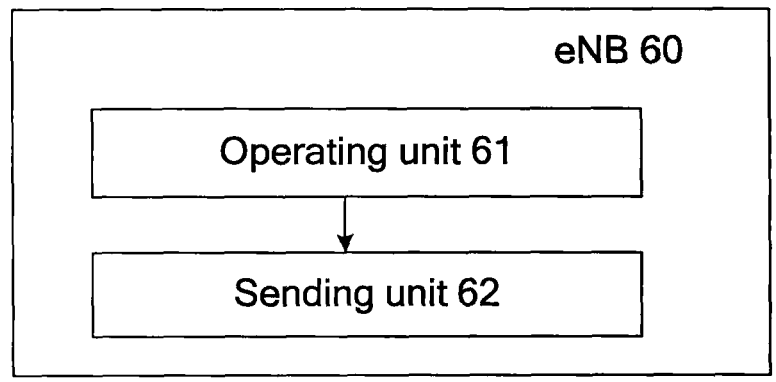
FIG. 6 is an exemplary schematic structural view of an eNB according to the sixth embodiment of the present disclosure.

An eNB is disclosed in the sixth embodiment of the present disclosure, as shown in FIG. 6. The eNB 60 includes:

an operating unit 61, configured to acquire the serial number in the system message; and a sending unit 62, configured to send an ETWS message carried in the system message if the serial number is different from the received serial number.

The eNB 60 may further include a converting unit (not shown), which is configured to: modify the serial number corresponding to the information change identifier carried in the system message to be the information change identifier; and, accordingly, the sending unit is further configured to send the information change identifier.

A system is disclosed in the seventh embodiment of the present disclosure. The system includes an MME. The MME is configured to: receive an ETWS message, and, if the received ETWS message is different from the ETWS message stored by the MME, set the information change identifier, and send the received ETWS message and the information change identifier.

A system is disclosed in the eighth embodiment of the present disclosure. The system includes a UE configured to: acquire the area identifier carried by the system message of adjacent cell B when the UE is handed over or reselected from cell A to adjacent cell B, where the area identifier is configured to indicate the area that covers the cell; and acquire the ETWS message carried in the system message if the area identifier is different from the area identifier stored in the UE.

A system is disclosed in the ninth embodiment of the present disclosure. The system includes an eNB. The eNB is configured to acquire the serial number in the system message; and send the ETWS message carried in the system message to the UE if the serial number is different from the received serial number.

Although the disclosure is described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for receiving a message, comprising:

acquiring, by a User Equipment (UE), a system message when the UE is handed over or reselected from a cell A to a cell B, wherein the system message includes an area identifier and an Earthquake and Tsunami Warning System (ETWS) message, wherein the area identifier indicates an area that covers the cell B;

reading the acquired area identifier and judging whether the acquired area identifier is different from a stored area identifier stored by the UE;

on condition that the acquired area identifier is different from the stored area identifier, reading the acquired ETWS message; and on condition that the acquired area identifier is the same as the stored area identifier, not reading the acquired ETWS message.

2. The method of claim 1, further comprising:

storing, by the UE, at least one of the acquired ETWS message and the acquired area identifier.

3. A User Equipment (UE), comprising:

a first unit configured to acquire a system message when the UE is handed over or reselected from a cell A to a cell B, wherein the system message includes an area identifier and an Earthquake and Tsunami Warning System (ETWS) message, wherein the area identifier indicates an area that covers the cell B;

a second unit configured to read the acquired area identifier;

a third unit configured to judge whether the acquired area identifier is different from a stored area identifier stored by the UE; and a fourth unit configured to read the acquired ETWS message on condition that the acquired area identifier is different from the stored area identifier, and to not read the acquired ETWS message on condition that the acquired area identifier is the same as the stored area identifier.

4. The UE of claim 3, further comprising:

a storing unit configured to store at least one of the acquired ETWS message and the acquired area identifier.

* * * * *